United States Patent Office 3,276,123
Patented Oct. 4, 1966

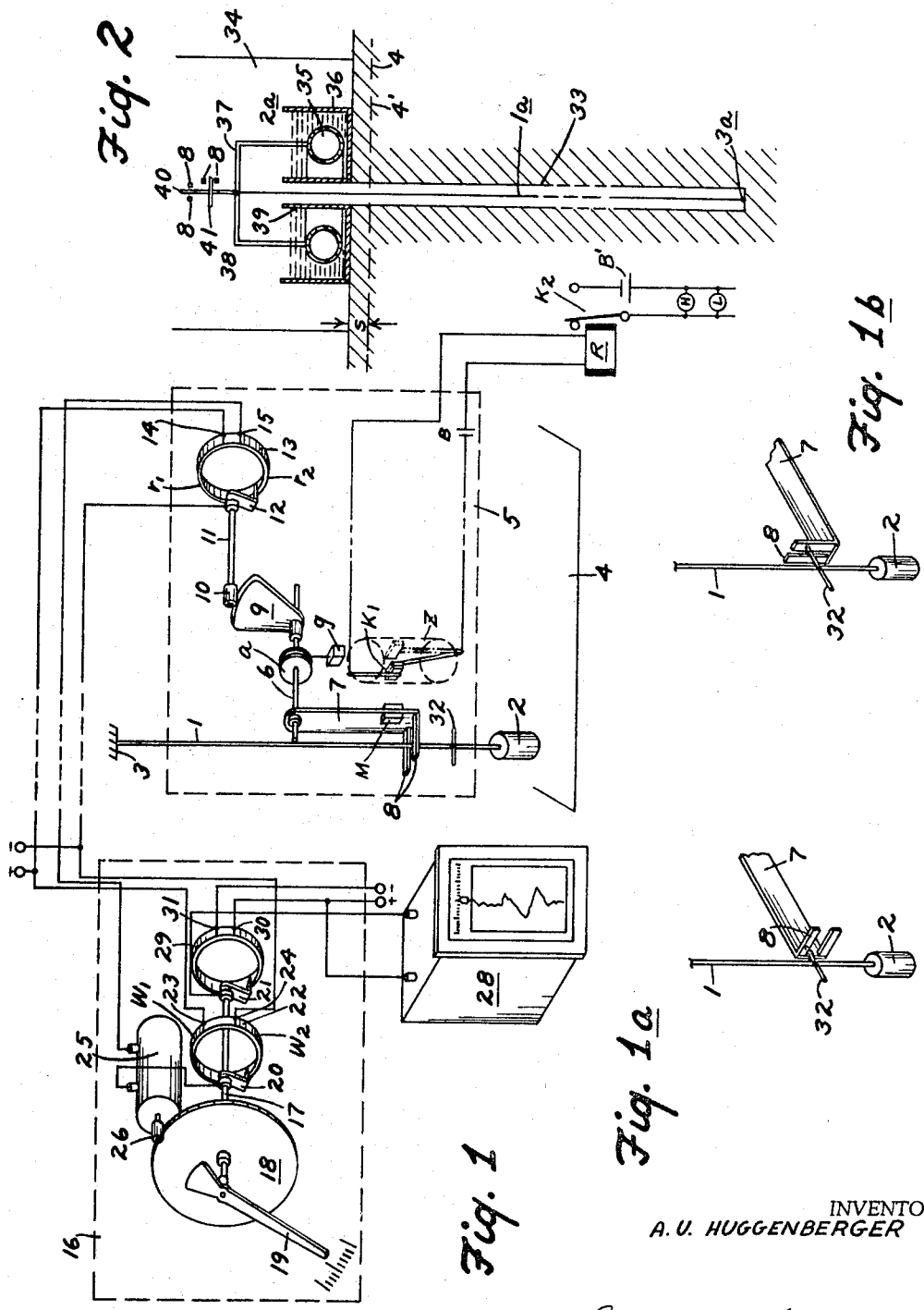

3,276,123
DEVICE FOR DETECTION AND RECORDING OF CHANGES AND DEFLECTION IN BUILDING STRUCTURES AND THE LIKE
Arnold U. Huggenberger, 119 Ackerstein St., Zurich, Switzerland
Filed Sept. 18, 1963, Ser. No. 309,675
Claims priority, application Switzerland, Sept. 26, 1962, 11,420/62
4 Claims. (Cl. 33—1)

This invention relates to apparatus used in conjunction with building structures, such as houses, towers, chimneys and the like wherein such structures settle or become out of plumb wherein measurement of the amount of the abnormality is made and/or recorded. While the primary object of the invention is for use in connection with building structures of all kinds, it will be appreciated that the same apparatus may be used for the detection of change from an original condition for all types of members, for example, beams, machine elements, and the like.

It is an object of the invention to provide a simple and economical apparatus which can readily be applied to a structure and wherein any change as to height or angularity of such structure can be detected or recorded at a remote point.

Other objects and features of the invention will be apparent from the disclosure to follow.

Briefly, the invention contemplates the use of a sensor element to which is mechanically coupled a motion detecting device comprising a potentiometer, at a point adjacent the sensor element. The sensor element is attached to the structure and comprises an extended rod or wire which maintains its position despite change in the structure and thus effects actuation of the potentiometer. The potentiometer is electrically connected to remotely located indicating apparatus comprising a small reversible D.C. motor which actuates a pointer and a second potentiometer. The potentiometers and the motors comprise an electrical bridge circuit so that voltages are balanced on the motor when the second potentiometer has been actuated thereby to a degree corresponding to the actuation of the first potentiometer by the sensor element. Thus, the potentiometer coacting with the scale signifies the degree of change in the structure. In addition, a conventional recording instrument can graphically depict such change relative to time.

The invention also contemplates a novel sensor element comprising a wire maintained in stretched condition by the buoyancy of a float submerged in a container of water. Such a sensor responds to very small change and is particularly useful where changes are to be detected with reference to a foundation or the earth.

A detailed description of the invention now follows in conjunction with the appended drawing, in which;

FIG. 1 is a schematic diagram showing the essential components;

FIGS. 1a and 1b show arrangements for measuring other types of dimensional change than the vertical change arrangement shown in FIG. 1; and FIG. 2 is a cross-sectional elevation showing a modified type of sensor element.

Referring now to the drawing, a sensor element 1, such as a wire or the like, has a weight 2 attached at its lower end and is suspended at 3 from what might be considered the highest point accessible within a structure, such as a tower, skyscraper, silo, warehouse, etc. Secured to or supported by a fixed element of the structure, as indicated by the datum plane reference character 4, which may be the floor, is a sensing means or motion detecting device, wherein the reference character 5 may be considered the housing of such an instrument, and is shown by dash-dot lines, the instrument being responsive to the sensor element for effecting electric signals. Thus, the shaft 6 carries an arm 7 terminating in a fork or yoke 8 which straddles wire 1. Further, shaft 6 carries the gear segment 9 meshing with a pionion 10 carried on shaft 11 and keyed to the rotative contact arm 12 of a potentiometer 13.

From the above mechanical aspects, it will be obvious that, should any change occur in the location of the suspension point 3 with respect to the datum level 4, wherein wire 1 moves horizontally, it will rock shaft 6 via yoke 8 and, accordingly, rotate contact arm 12 via gear segment 9 so that the resistance of the potentiometer on each side of the contact will vary. Thus, the values of $R_1$ and $R_2$ will change in relation to each other, such values being, of course, the resistance between the movable contact point and terminal 14 for $R_1$ and between the contact point and terminal 15 for $R_2$. Normally, $R_1$ equals $R_2$ and the unbalancing of these values effects unbalance of a resistance bridge which comprises a source of D.C. power, shown as the upper positive and negative terminals on the drawing, with plus and minus symbols. The bridge also comprises a potentiometer 22 having a terminal 23 connecting to the positive side of the line and also to the terminal 14 and further having a terminal 34 connecting to the negative side of the line and to the contact arm 12. The diagonal connections of such an electrical resistance bridge comprises a small D.C. motor 25 of reversible type depending upon polarity applied, and the applied voltage, as indicated by the plus and minus terminals. The system is self-balancing in a known manner, in that when $R_1$ becomes more or less than $R_2$ due to rotation of contact arm 12 in degree responsive to relative horizontal movement of wire 1, motor 25 is energized in a direction depending upon the direction of shift of the wire. However, motor 25 is geared at 26 to an indicator disc 18 in turn keyed to shaft 17, which can rotate contact arm 20 of potentiometer 22. The direction of rotation provided for arm 22 is such as to once more balance the bridge whence potential to the motor becomes zero and the motor stops. In other words, the unbalance of $R_1$ and $R_2$ is matched by the unbalance of $W_1$, $W_2$, the resistance on each side of the arm 20, to create a null, and the degree of rotation of disc 18 at the time the null point is reached corresponds to the amount of horizontal shift of wire 1, i.e., is proportional thereto. Shaft 17 carries the pointer 19 which co-acts with the indicia 27 to indicate extent and direction of relative movement of the sensor element. The components which make up the receiver of the slave system of the apparatus may all be housed at a remote point in a cabinet as indicated by the dash-dot line 16.

If a permanent graph of relative deflection of the sensor element is required, a conventional recording instrument as indicated by 28 may be tapped off the terminals 30 and 31 of another potentiometer 29, having the contact arm 21 keyed to shaft 17, so as to be actuated along with arm 20. A separate source of voltage indicated above instrument 28 as plus and minus would be utilized for such purpose. Obviously, the last named potentiometer simply duplicates the function of the slave potentiometer 22 to control a recording pen in the recorder 28.

It will be apparent from the above that modification could be made so as to measure deflection between point 3 and the datum plane 4 in other directions. For example, a pin 32 is carried by the wire 1 and the fork 8 arranged to straddle the pin 32 in a vertical plane for measuring vertical change. For such purpose the instrument box 5 need only be re-oriented, to obtain the position of FIG. 1a for the fork. Twisting deflection using the same instrument could likewise be measured, again using the pin 32 with the yoke 8 straddling the pin as shown in FIG. 1b.

Referring now to FIG. 2, a form of sensor element is shown particularly adapted for measuring the extent of settling of a building. Thus, a wire 1a is disposed axially in a bore 33 going down into the ground below the initial datum plane 4 and being fastened at 3a. The length of bore 33 is sufficient so that settling of the structure does not in any way disturb the location to any practical extent of the fixed point 3a as the structure settles from the initial plane 4 to a subsequent plane 4' through the distance S.

Fixedly disposed with respect to the datum plane 4, which may be considered to be the floor of building 34, is a water vessel 36 in which is disposed a toroidal float 35 having a cross bar 37 to which the upper end of the wire is fastened at the point 38. Thus, the buoyancy of the float will maintain the wire 1a taut and will keep the float at a particular level with reference to the initial datum plane 4, the wire passing through a collar 39 sealingly secured at the bottom of the tank. The bar 37 has secured to it a rod 40 rising vertically to which a cross pin 41 is secured. The cross pin 41 is straddled by a yoke having arms 8 as in FIG. 1a, which yoke is fixed to move with datum plane 4.

Accordingly, as the structure 34 settles, the tank 36 moves downwardly with datum plane 4 while the float remains stationary. The sensor is used in conjunction with the electrical apparatus as shown in FIG. 1, the yoke 8 being disposed as in FIG. 1a and rotating as datum plane 4 moves down, whence settling of the structure is measured. As a matter of relative motion, the float 35 becomes the true datum plane in this instance, or the point 3a may be so considered.

An additional apparatus, as shown in FIG. 1, can be juxtaposed with respect to the pin 40, as indicated by the upper yoke 8 in FIG. 2 for the purpose of measuring horizontal shift of the building 34. Obviously, a third measuring apparatus could be applied as in FIG. 1b for measuring twist.

It will be apparent from the foregoing that the weight 2 of FIG. 1 or the float 2a of FIG. 2 are of sufficient magnitude as to minimize any reaction force of the yoke 8 on the wire 1 or 1a, respectively, or the pin 40. If need be, the yoke 8 can be counter-weighted with respect to the shaft 6.

Features usable with the form of either FIG. 1 or 2 are shown on FIG. 1. Thus, if desired a pulley a may be keyed to the shaft 6 to which is attached, by a thread, as shown, a weight g. This will, of course, have the effect of biasing the arm 8 to rotate into the plane of the paper, maintaining the outer prong of the fork 8 against the wire 1. Such an arrangement may be used in order to overcome any possible lost motion where it is known that the wire will move in the direction of the outer prong. Normally, with close spacing of the prongs, such bias may be eliminated and would not be used. However, if a single prong 8, such as the outer prong as shown in FIG. 1, be used, then the weight biasing means would be used in conjunction therewith in order to insure the prong being engaged by the wire, should it shift. An advantage of such a construction is that a substantially constant force is exerted by the wire and the prong.

For purposes of providing an alarm in the event of structural distortion beyond a desired degree the arm 7 carries a magnet M capable of attracting magnetic contacts $K_1$ housed within a protective non-magnetic cylinder Z. Thus, when arm 7 is in a neutral position, indicating no movement of the structure, the contacts $K_1$ are closed, in the manner of any conventional magnetic switch. Such closure of the contacts energizes the relay R via the battery B to maintain contacts $K_2$ normally open. Accordingly, battery B' is open circuited and neither the horn H nor the signal lamp L is energized. However, should the wire 1 shift, the arm 7 will swing so that the magnet M moves too far away from the magnetic switch contacts whence they spring open, as indicated by the phantom lines. This de-energizes the relay R, permitting contacts $K_2$ to close, energizing the horn and signal lamp, when the wire shifts beyond a desired degree.

It will be appreciated that the concept of the invention may be varied by persons skilled in the art, such as substitution of photoelectrical means for detecting movement of the wire 1 or the pin 32, or the use of movable transformer cores in place of the potentiometers described. Also, the sensing system can be coupled with any suitable alarm device for operating lights or sound generators when a critical limit of change is encountered.

In any event, the broad concept of providing measurement between the top or bottom of a structure and a fixed datum plane, by an elongated wire or rod, as taught herein, is believed novel, and useful for buildings, dams, and other structures. In particular, the buoyant float sensor means is well suited for dams with the fluid vessel on the top wall thereof. Also, such arrangement can be used for buildings with the vessel secured to the highest point, or the weighted sensor means can be applied to dams.

Having thus described the invention, it is realized that changes may be made without departing from the spirit thereof and, therefore, it is not desired that the invention be limited to the precise illustration herein given except as set forth in the following claims.

What is claimed is:

1. In an apparatus for detecting change in a structure, an instrument comprising a movable element and a mechanical system for coupling said element to control electrical circuitry operative to sense movement of said element, means for support of said element and said mechanical system whereby said element and mechanical system may be positionally changed so that said element may selectively engage movable members in a plurality of planes to be actuated thereby for detecting change in corresponding planes, one of said plurality of members being a relatively elongated wire, and another of said members being carried thereby and extending at an angle thereto, said movable element having a yoke with spaced arms to straddle said wire or said member carried thereby.

2. Apparatus for detecting a change in a structure comprising a sensor means having an elongated member with a lower end relatively fixedly secured and a float supporting the upper end, a fluid vessel wherein said float may be buoyantly in fluid therein and is thus relatively fixed, motion sensing means adapted to be disposed for movement with said structure and having an element coacting with said elongated member operative to detect a change of position of said structure with respect to said elongated member, said fluid vessel being a container having an integral collar disposed to extend above the fluid level therein, said elongated member passing upwardly therethrough, said float being a toroid surrounding said collar and having a bar secured thereto above said collar and said upper end of said elongated member being secured to said bar.

3. Apparatus for detecting a change in a structure comprising a sensor means having an elongated member with a lower end relatively fixedly secured and a float for supporting the upper end, a vessel wherein said float is buoyant in liquid therein and is thus relatively fixed, motion sensing means adapted to be disposed for movement with said structure and having an element coacting with said elongated member operative to detect a change of position of said structure with respect to said elongated member, said float being disposed relative said vessel so as to be fully submerged in said liquid.

4. In an apparatus for detecting movement of a structure in a plurality of planes, an instrument comprising a movable element and a mechanical system for coupling said element to control electrical circuitry operative to sense movement of said movable element, support means for unitary support of said movable element and said mechanical system whereby said movable element and mechanical system may be selectively positioned as a unit so that said movable element may selectively engage a sensor means in a plurality of planes to be actuated thereby for detecting movement of said structure in a plurality of planes, sensor means comprising an elongated sensor element having a member thereon, said movable element having means for selectively engaging said elongated element or the member thereon dependent upon selective positioning of said support means.

References Cited by the Examiner

UNITED STATES PATENTS

| | | | |
|---|---|---|---|
| 893,997 | 7/1908 | Haas et al. | 33—216 X |
| 1,230,787 | 6/1917 | Robinson et al. | 33—216 X |
| 1,237,734 | 8/1917 | Wood | 33—206.5 X |
| 1,641,296 | 9/1927 | Scott | 73—88 |
| 1,928,970 | 10/1933 | Johnston | 33—205.5 |
| 2,198,523 | 4/1940 | Adams | 33—206.5 |
| 2,621,315 | 12/1952 | Cuckler | 346—32 |
| 2,809,435 | 10/1957 | Nicholson et al. | 73—152 |

FOREIGN PATENTS 148,918  4/1961  Russia.

LEONARD FORMAN, *Primary Examiner.*

ISAAC LISANN, *Examiner.*